(12) United States Patent
Eleftheriou et al.

(10) Patent No.: US 8,661,196 B2
(45) Date of Patent: Feb. 25, 2014

(54) OPTIMIZING LOCATIONS OF DATA ACCESSED BY CLIENT APPLICATIONS INTERACTING WITH A STORAGE SYSTEM

(75) Inventors: Evangelos S. Eleftheriou, Rueschlikon (CH); Robert Galbraith, Rochester, MN (US); Adrian C. Gerhard, Rochester, MN (US); Robert Haas, Rueschlikon (CH); Xiao-Yu Hu, Rueschlikon (CH); Murali N. Iyer, Rochester, MN (US); Ioannis Koltsidas, Rueschlikon (CH); Timothy J. Larson, Rochester, MN (US); Steven P. Norgaard, Rochester, MN (US); Roman Pletka, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 13/209,514

(22) Filed: Aug. 15, 2011

(65) Prior Publication Data

US 2013/0046931 A1 Feb. 21, 2013

(51) Int. Cl.
*G06F 12/00* (2006.01)
(52) U.S. Cl.
USPC .......................................................... 711/114
(58) Field of Classification Search
None
See application file for complete search history.

(56) References Cited

U.S. PATENT DOCUMENTS

| 7,249,277 B2 * | 7/2007 | Arai et al. ..................... 714/6.21 |
| 2010/0205149 A1 * | 8/2010 | Sekiya .......................... 707/640 |
| 2011/0185124 A1 * | 7/2011 | Koseki ........................... 711/114 |

OTHER PUBLICATIONS

Ioannis Koltsidas & Stratis D. Viglas, "Flashing Up the Storage Layer," PVLDB '08, pp. 514-525; Aug. 2008.
Wikipedia, The Free Encyclopedia, [Online]; [retrieved on Jun. 16, 2011]; retrieved from the Internet https://secure.wikimedia.org/wikipedia/en/wiki/Solid-state_drive Wikipedia Contributors, "Solid-state Drive," pp. 1-22; 2011.
Wikipedia, The Free Encyclopedia, [online]; [retrieved on Jun. 10, 2011]; retrieved from the Internet https://secure.wikimedia.org/wikipedia/en/wiki/Standard_RAID_levels Wikipedia Contributors, "Standard RAID Levels," pp. 1-13; 2011.
Xiaojian Wu & A.L. Narasimha Reddy, "Exploiting Concurrency to Improve Latency and Throughput in a Hybrid Storage System," Proceedings of the IEEE International Symposium on Modeling, Analysis and Simulation of Computer and Telecommunication Systems, 2010.
Mustafa Canim et al., "An Object Placement Advisor for DB2 Using Solid State Storage," Very Large Data Base Endowment •09, Aug. 2009.

* cited by examiner

*Primary Examiner* — Brian Peugh
(74) *Attorney, Agent, or Firm* — Cantor Colburn LLP; Daniel Morris

(57) ABSTRACT

A method for optimizing locations of physical data accessed by one or more client applications interacting with a storage system, with the storage system comprising at least two redundancy groups having physical memory spaces and data bands. Each of the data bands corresponds to physical data stored on several of the physical memory spaces. A virtualized logical address space includes client data addresses utilizable by the one or more client applications. A storage controller is configured to map the client data addresses onto the data bands, such that a mapping is obtained, wherein the one or more client applications can access physical data corresponding to the data bands.

8 Claims, 4 Drawing Sheets

OPTIMIZING LOCATIONS OF DATA ACCESSED BY CLIENT APPLICATIONS INTERACTING WITH A STORAGE SYSTEM

BACKGROUND

The invention relates to methods and systems for optimizing locations of physical data accessed by one or more client applications interacting with a storage system.

Flash-based Solid State Drives have emerged as a high-performing and viable alternative to magnetic disks for data-intensive applications. In the future, enterprise storage systems, as well as commodity hardware, are expected to incorporate both Solid State Drives (SSDs) and Hard Disk Drives (HDDs) as storage media. SSDs are purely electronic devices with no mechanical moving parts, and therefore the access time for a block is independent of the position of a block on the physical medium. This allows SSDs to have an excellent random read performance, see e.g., Wikipedia contributors. "Solid-state drive." Wikipedia, The Free Encyclopedia. Wikipedia, The Free Encyclopedia, 16 Jun. 2011. Web. 16 Jun. 2011.

Endurance limitations and the fact that updating a flash page requires that the whole block to which the page belongs must be erased first lead to sophisticated techniques used by SSD controllers to speed up random writes. In some cases, random write performance can be achieved which is on par with random read performance. The sequential read and write performance of SSDs can compete with or even outperform HDDs'.

A hybrid storage system is a system that utilizes both types of storage media for persistent storage, i.e., the solid state drive is not used as a cache; rather, it is used at the same level of the memory hierarchy as the HDDs. Typically, arrays of multiple SSDs and arrays of multiple HDDs are used to form redundancy groups to achieve higher performance and reliability (using the so-called RAID scheme or any other scheme), see e.g., Wikipedia contributors. "Standard RAID levels." Wikipedia, The Free Encyclopedia. Wikipedia, The Free Encyclopedia, 10 Jun. 2011. Web. 16 Jun. 2011.

BRIEF SUMMARY

According to a first aspect a method for optimizing locations of physical data accessed by one or more client applications interacting with a storage system is disclosed. The storage system includes a set of at least two redundancy groups, wherein each of the redundancy groups comprises physical memory spaces and data bands, each of the data bands corresponding to physical data stored on several of the physical memory spaces of the each of the redundancy groups; a virtualized logical address space, comprising client data addresses utilizable by the one or more client applications; and a storage controller configured to map the client data addresses onto the data bands, such that a mapping is obtained, whereby the one or more client applications can access physical data corresponding to the data bands. The method includes, at the storage controller: swapping locations of physical data corresponding to one data band of one of the at least two redundancy groups with physical data of another data band of another one of the at least two redundancy groups, based on data access needs of the one or more client applications and accordingly updating the mapping.

In embodiments, the method may comprise one or more of the following features: at the step of swapping, the one data band and the another data band are constrained to belong to a same data band group, the latter defined within a set of data band groups, wherein each data band group of the set of data band groups comprises at least two data bands, each of the at least two data bands belonging to different redundancy groups of the set of redundancy groups; at the step of swapping, there is a one-to-one mapping between the data bands in the set of data band groups and the data bands in the set of redundancy groups; at the step of swapping, the set of data band groups is defined such that a $j^{th}$ data band group of the set of data band groups comprises a $j^{th}$ data band of each of the redundancy groups.

At the step of swapping, the set of data band groups is defined such that, considering the data bands numbered linearly along the at least two redundancy groups such as to form a well-ordered set of natural number, any two data bands within a given data band group in the set of data band groups are congruent modulo N, where N is the modulus, fulfilling the condition $(C_1/k)=(C_2/l)=N$, wherein: $C_1$ is a capacity in bands of a first one of the redundancy groups; $C_2$ is a capacity in bands of a second one of the redundancy groups; and each of the data band groups comprises k data bands of the first one of the redundancy groups and l data bands of the second one of the redundancy groups; each of the data bands corresponds to a set of consecutive logical addresses, the logical addresses identifying the physical data and being managed at the level of redundancy groups; each of the logical addresses of the set of consecutive logical addresses points to a corresponding physical address in one of the redundancy groups, such that the each of the data bands corresponds to several physical memory spaces in one of the redundancy groups; the storage controller maps the client data addresses onto the data bands using one logical address of the set of consecutive logical addresses per data band mapped; at least two redundancy groups of the set of redundancy groups have different characteristics in terms of data access performances and/or data retention; the data access needs are determined by statistics of data accesses by the one or more client applications; the statistics are dynamically updated; and a redundancy group of the set of redundancy groups corresponds to a set of one or more hard disk drives and another redundancy group of the set of redundancy groups corresponds to a set of one or more solid state drives.

According to another aspect, the invention is embodied as a storage system configured for optimizing locations of physical data accessed by one or more client applications, comprising: a set of at least two redundancy groups, wherein each of the redundancy groups comprises physical memory spaces and data bands, each of the data bands corresponding to physical data stored on several of the physical memory spaces of the each of the redundancy groups; a virtualized logical address space, comprising client data addresses utilizable by the one or more client applications; and a storage controller configured to: map the client data addresses onto the data bands, such that a mapping is obtained, whereby the one or more client applications can access physical data corresponding to the data bands; and swap locations of physical data corresponding to one data band of one of the at least two redundancy groups with physical data of another data band of another one of the at least two redundancy groups, based on data access needs of the one or more client applications, and accordingly update the mapping.

In embodiments, the storage system may comprise one or more of the following features: the storage controller is further configured to constrain the one data band and the another data band to belong to a same data band group, the latter defined within a set of data band groups, wherein each data band group of the set of data band groups comprises at least two data bands, each of the at least two data bands belonging to different redundancy groups of the set of redundancy groups; the set of data band groups is defined such that a $n^{th}$ data band group of the set of data band groups comprises a $n^{th}$ data band of each of the redundancy groups; each of the data bands corresponds to a set of consecutive logical addresses, wherein each of the logical addresses points to a corresponding physical address in one of the redundancy groups, such that the each of the data bands corresponds to several physical memory spaces in one of the redundancy groups; the storage controller is configured to map the client data addresses onto the data bands using one of the logical addresses of the set of consecutive logical addresses per data band mapped; the data access needs are determined by statistics of data accesses by the one or more client applications; and each of the data bands corresponds to at most 1.03125 megabyte of the stored physical data.

According to still another aspect, the invention is embodied as a computer program residing on a computer-readable medium, comprising instructions for causing a storage system according to embodiments such as described above to map the client data addresses onto the data bands, such that a mapping is obtained, whereby the one or more client applications can access physical data corresponding to the data bands; and swap locations of physical data corresponding to one data band of one of the at least two redundancy groups with physical data of another data band of another one of the at least two redundancy groups, based on data access needs of the one or more client applications, and accordingly update the mapping. Methods, devices and systems embodying the present invention will now be described, by way of non-limiting examples, and in reference to the accompanying drawings.

DETAILED DESCRIPTION

The detailed description comprises two sections. The first section is a high-level description of the preferred embodiments. The second section concerns details of specific implementations.

1. High-Level Description of the Preferred Embodiments

As an introduction to the following description, it is first discussed general aspects of the invention, directed to methods and systems for optimizing locations of physical data which are accessed by client applications interacting with a storage system.

1.1 General Embodiment

Figure 1:
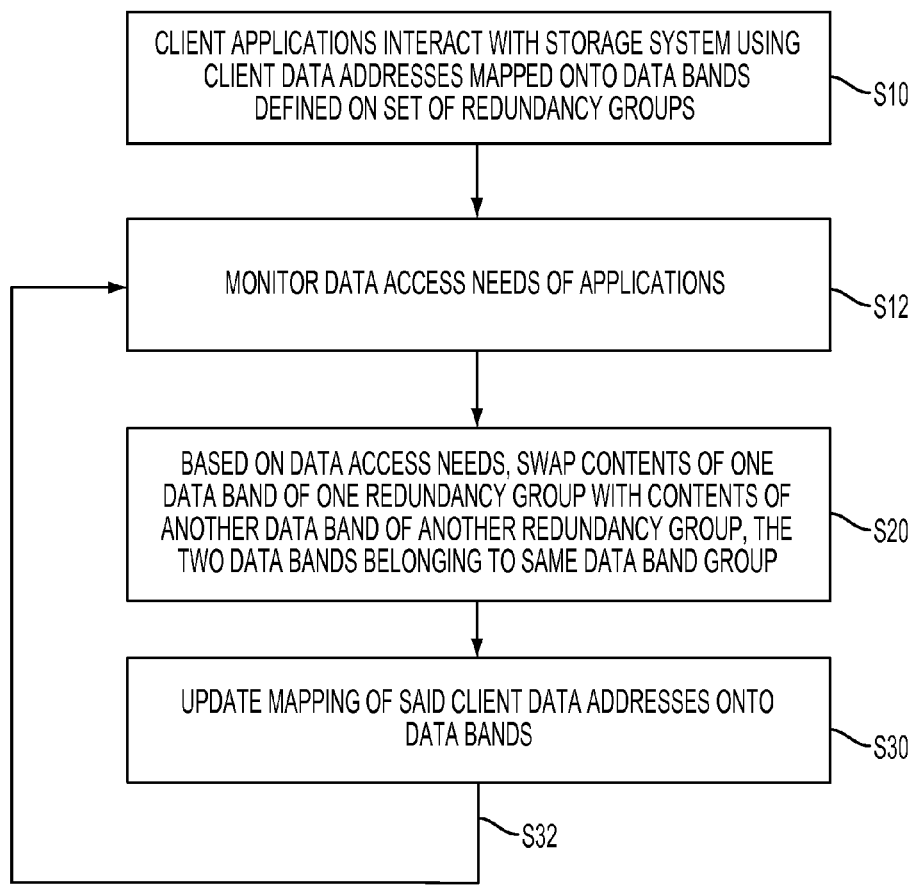
FIG. 1 is a flowchart depicting high-level steps of embodiments of the method according to the invention.
Figure 2:
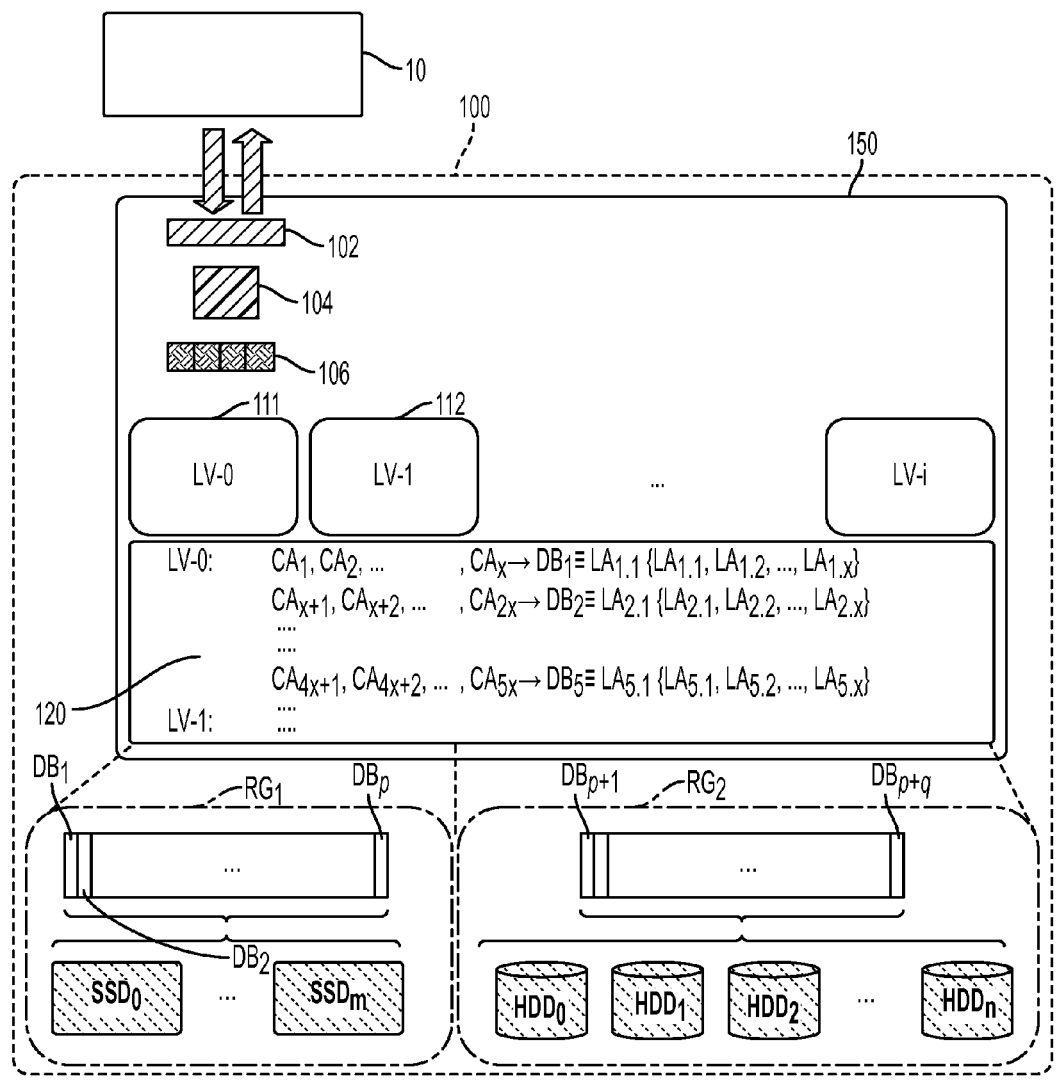
FIG. 2 is a schematic representation of a storage system as configured in embodiments of the invention.
Figure 3:
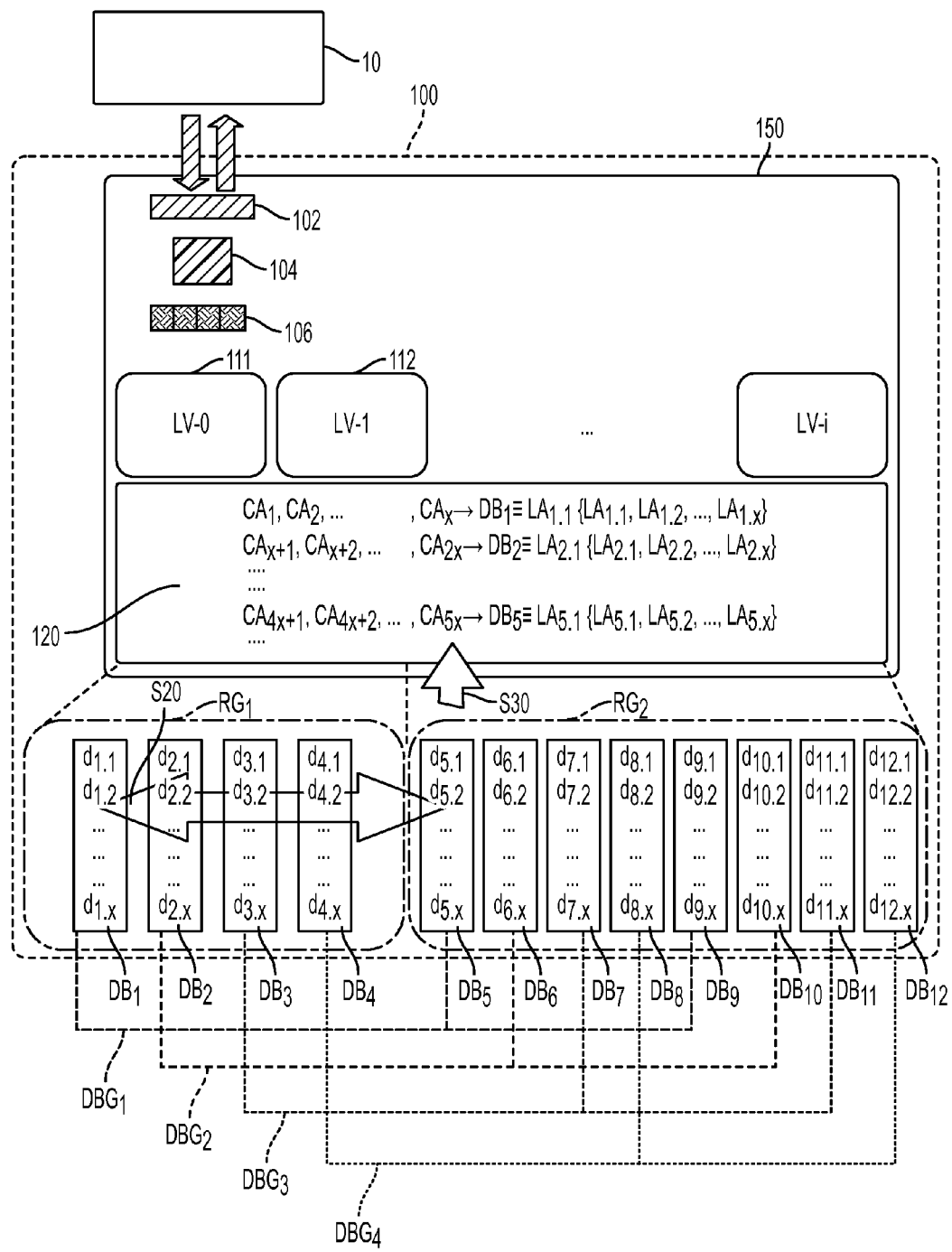
FIGS. 3 and 4 are schematic representations of a storage system, respectively before (FIG. 3) and after (FIG. 4) instructing to swap physical data corresponding to data bands of two redundancy groups, according to embodiments of the present invention.
Figure 4:
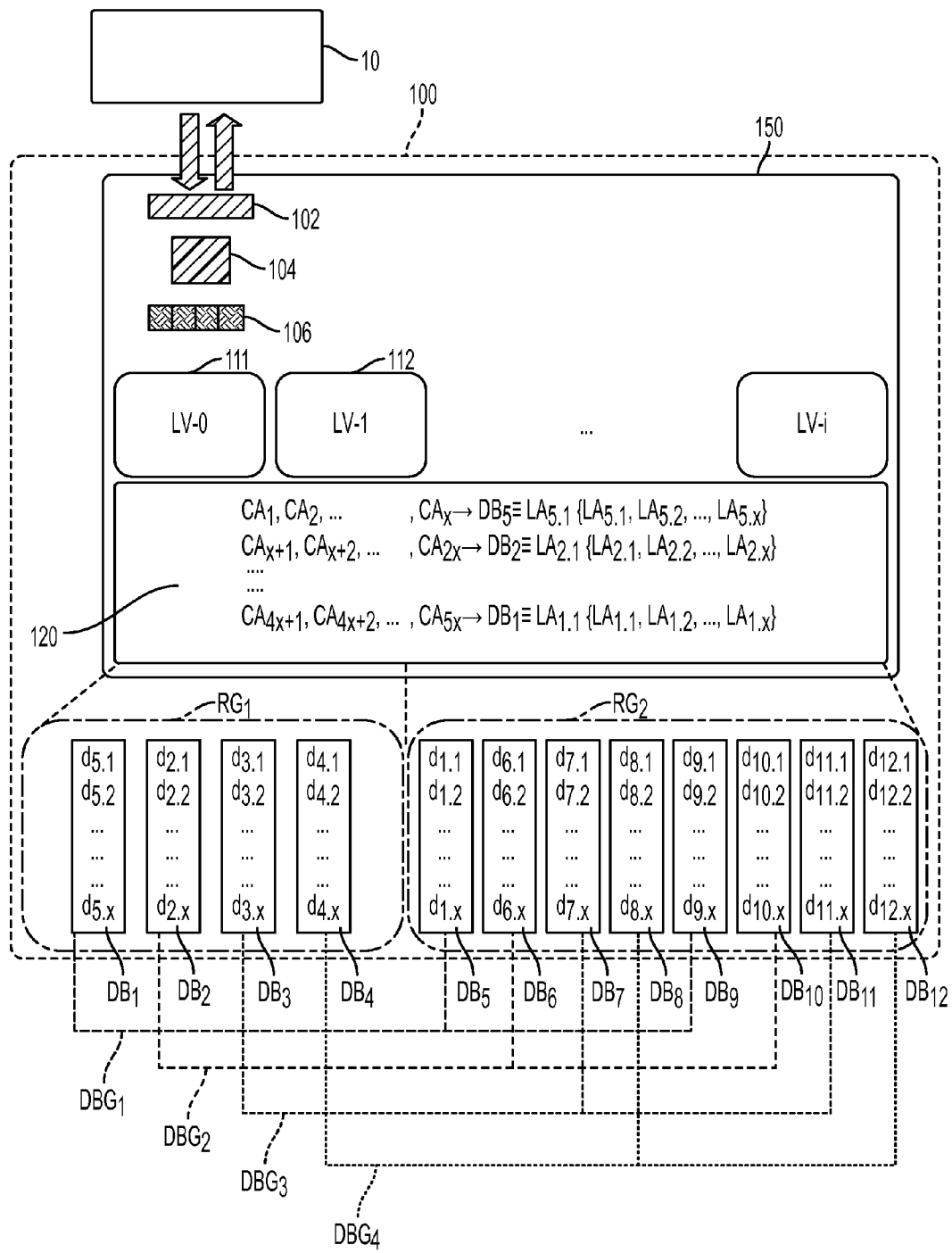

Such a storage system is for instance depicted in FIGS. 2-4. High-level steps of the methods are shown in the flowchart of FIG. 1. The storage system 100 typically comprises a set of redundancy groups (hereafter RGs), denoted by $RG_1$, $RG_2$, etc., in FIGS. 2 and 3. Each of the RGs may for example contain an array of one or more SSDs or HDDs (respectively denoted by $SSD_i$ or $HDD_j$ in FIG. 2). As depicted in FIG. 2, we may for example assume a generic storage system equipped with an array of m SSDs ($SSD_0$, $SSD_1$, ..., $SSD_m$) and an array of n HDDs ($HDD_0$, $HDD_1$, ..., $HDD_n$), which form the SSD redundancy group $RG_1$ and the HDD redundancy group $RG_2$, respectively. Redundancy groups are known per se. In particular, a RG comprises physical memory spaces with physical data stored thereon. RGs may for instance be defined as storage subsystems (typically having different access/storage performances and/or reliability characteristics), wherein each RG is configured such that an error therein (read/write error, disk failure, or any type of error, etc.) does not impact any of the other RGs of the set of RGs.

In addition, and irrespective of the exact nature of the storage subsystems (SSDs, HDDs, etc.), here data bands are defined therein such that each of the bands corresponds to physical data stored on several physical memory spaces of each of the RGs. Such data bands are symbolically depicted in FIGS. 2-4. For example, in FIG. 2, data bands $DB_1$, $DB_2$, ..., $DB_p$ are defined in $RG_1$ and stored on $SSD_0$, ..., $SSD_m$, data bands $DB_{p+1}$, $DB_{p+2}$, ..., $DB_{p+q}$ are defined in $RG_2$ and stored on $HDD_0$, ..., $HDD_n$. Note that only the first two and the last data bands in each RG are (symbolically) represented in FIG. 2, for obvious conciseness reasons. The placement of DBs within a RG to physical locations on the storage subsystems (SSDs or HDDs) of that RG is defined by the scheme used, e.g., a RAID scheme. In FIGS. 3-4, the underlying storage subsystems (SSDs, HDDs) are not represented: only the data bands (in this pedagogical example data bands $DB_1$-$DB_{12}$) are depicted. A data band may hereafter be referred to as a "band of data" or, simply, a "band".

The storage system further comprises a virtualized logical address space 120 (hereafter VLAS). The latter comprises client data addresses utilizable by the client applications 10 when interacting with the storage system 100. Also, a storage controller 150 is provided which takes care of mapping (and maintaining the mapping) of the client data addresses onto the data bands. Accordingly, the client applications can transparently access the physical data corresponding to the bands by utilizing the client addresses.

As for example illustrated in FIG. 2, 3 or 4, the simplified notation:

$CA_1, CA_2, \ldots, CA_x \rightarrow DB_1 \equiv LA_{1.1} \{LA_{1.1}, LA_{1.2}, \ldots, LA_{1.x}\}$
means that a first set of x client addresses ($CA_1$, $CA_2$, ..., $CA_x$) is mapped onto a first data band ($DB_1$). Similarly,
$CA_{4x+1}, CA_{4x+2}, \ldots, CA_{5x} \rightarrow DB_5 \equiv LA_{5.1} \{LA_{5.1}, LA_{5.2}, \ldots, LA_{5.x}\}$
denotes a fifth set of x client addresses ($CA_{4x-1}$, $CA_{4x+2}$, ..., $CA_{5x}$) mapped onto a fifth data band ($DB_5$). In this example, the client address space actually has the same granularity as the logical address space's, i.e., there is a 1-to-1 mapping between the client addresses CA and the logical addresses LA. The above notation further reflects a particular embodiment to be discussed later in details. In short: data bands may actually correspond to a set of consecutive logical addresses (e.g., $LA_{1.1}$, $LA_{1.2}$, ..., $LA_{1.x}$), which logical addresses identify in turn the physical data (e.g., $d_{1.1}$, $d_{1.2}$, ..., $d_{1.x}$), see FIG. 3 or 4. The correspondence between logical addresses and physical addresses is typically managed at the level of the redundancy groups, as already known from the prior art. Accordingly, a given data band $DB_1$ can be represented using e.g., the first logical address or $LA_{1.1}$ of the set of consecutive addresses corresponding to $DB_1$, whence the notation used in FIGS. 2-4 (e.g., $DB_1 \equiv LA_{1.1}$).

In addition, the storage controller may decide to swap (step S20 in FIG. 1 or FIG. 3) physical data corresponding to one band of one RG with physical data of another band (e.g., of another RG), e.g., based on data access needs of the client applications or other criteria. As to be explained later, data access needs may be monitored (step S12 in FIG. 1) in various manners. If the storage controller decides to swap physical data (step S20 in FIG. 1 or FIG. 3), then the mapping of the client data addresses onto the bands is accordingly updated by the controller 150, see step S30 in FIGS. 1 and 3. This way, data location can be optimized transparently for the client applications which continue to access data through the VLAS 120. Note that FIG. 4 represents the storage system after swapping physical data, and after updating the mapping of the client data addresses onto the data bands. As a result of the swapping and updating steps, in FIG. 4, the data contents $d_{5.1}$, $d_{5.2}$, ..., $d_{5.x}$ initially corresponding to $DB_5$ have been exchanged with $d_{1.1}$, $d_{1.2}$, ..., $d_{1.x}$, i.e., the physical data initially corresponding to $DB_1$. Because the mapping of the client data addresses onto the bands is consistently updated, the VLAS 120 now exposes client addresses $CA_1$, $CA_2$, ... $CA_x$ that are mapped onto $DB_5 \equiv LA_{5.1}$ $\{LA_{5.1}, LA_{5.2}, ..., LA_{5.x}\}$. and $CA_{4x+1}$, $CA_{4x+2}$, ..., $CA_{5x}$ are now mapped onto $DB_5 \equiv LA_{1.1}\{LA_{1.1}, LA_{1.2}, ..., LA_{1.x}\}$, the rest being unchanged. As a result, client applications can still access the data contents $d_{5.1}$, $d_{5.2}$, ..., $d_{5.x}$ or $d_{1.1}$, $d_{1.2}$, ..., $d_{1.x}$, using the same client addresses as before. Thus, the locations of the data contents can be optimized, yet in a transparent way for the client applications.

Such an architecture is fairly simple: applications do not need to interact with a front end (i.e., a host adapter) and no additional processing complex outside the storage controllers is required.

1.2 Preferred Variants

In addition, swapping of physical data may be constrained such that the bands can be swapped only if they belong to one and a same predefined data band group (also referred to as "band group" or "group" in the following). As it can be realized, predefining band groups into which data can be swapped may significantly reduce the mapping information and therefore allow the storage system to accommodate smaller granularity (i.e., piece of data) and smaller timescale for swapping data. In other words, the obtained system can scale up more easily. For instance, in embodiments, each of the bands corresponds to at most 1 (or 1.03125, see below) MB of stored physical data, possibly to 512 or even, 256 KB.

There are various possibilities for predefining band groups into which data can be swapped. Notably, the band group can be defined explicitly or implicitly. The latter option is nonetheless preferred in case of limited DRAM resources.

For example, each band group may comprise at least two bands from two distinct RGs, i.e., one of the at least two bands belongs to a first RG, another one of the at least two bands belongs to a second RG. This is exemplified in FIG. 3, where, for instance $DBG_1$ is predefined as comprising $DB_1$ (which belongs to $RG_1$) and $DB_5$ and $DB_9$ (belonging to $RG_2$). Similarly, $DBG_2$ comprises $DB_2$ (in $RG_1$) and $DB_6$ and $DB_{10}$ (in $RG_2$), etc. This way, one can easily swap data corresponding to data bands in different RGs, while imposing a constraint as to the data bands considered for swapping. Such a constraint is particularly simple to implement in practice, using an explicit or implicit scheme.

What band (in a given RG) belongs to what band group could for instance be chosen at random, which poses no difficulty in practice especially when the RGs comprises a fixed number of bands. Yet, many other simple schemes can be devised. For example: a $j^{th}$ band group is implicitly defined as comprising at least the $j^{th}$ band of each of the RGs, as is the case in the example of FIG. 3, which makes the band group structure more predictive and thus easier to manage.

Interestingly, one possibility consists of implicitly defining band groups using modular arithmetic (also called clock arithmetic). Assuming for instance that bands are numbered linearly along the RGs, such as to form a well-ordered set of natural number 1, 2, 3, ... (just like in FIG. 3), then any two bands within a given band group are congruent modulo N, where N is the modulus. Such a definition provides a simple, implicit definition of the groups, requiring no additional metadata.

Preferably, assuming that each of the band groups comprises k data bands of a first RG (e.g., the SSD array) and l data bands of a second RG (e.g., HDD's), the following condition is imposed: $N=C_1/k=C_2/l$, wherein $C_1$ and $C_2$ are the capacities in bands (i.e., the number of bands) of respectively a first RG and a second RG (In FIG. 2, $C_1$=p and $C_2$=q). It can be realized that this additional constraint ensures that groups are commensurate to the bands, i.e., it ensures that each of the band groups comprises at least one band in each of the RGs. Accordingly, an implicit scheme is obtained (easy to manage in RAM), which allows for swapping data between the two RGs (or any two RGs if the condition is generalized to many RGs), subject to the constraint that the data belong to bands in a same group.

For example, N can be chosen to correspond to the number of bands in that RG that has the minimal number of bands. For instance, assume that this RG is the first RG and that k=1. Now, imposing the condition $N=C_1/k=C_2/l$ (i.e., $C_1=C_2/l=N$), each of the band groups comprises exactly one band in the first RG, and l bands in the second RG.

As another example, if each RG has a same (fixed) number of 2n bands (here n does not relate to the number of HDDs in FIG. 2), then N could be defined as N=r n, where r=1 or 2. Similarly, if each RG has a same (fixed) number of m (odd) bands (m not related to FIG. 2), then N could be defined as N=m.

Incidentally, we note that the three examples above match another, somewhat more general definition, according to which the $j^{th}$ band group comprises at least the $j^{th}$ band of each of the RGs. However, other definitions could be formulated, matching the more general definition given earlier, i.e., each data band group comprises at least two bands, each of the bands belonging to different RGs.

This shall be better understood by considering the example of FIG. 3. As can be seen, here the bands $DB_1$, ... $DB_n$, ... $DB_{12}$ are numbered linearly along the RGs (from left to right in this representation), such as to form a well-ordered set of natural number $\{1, ... n, ... 12\}$. Now, the first band group $DBG_1$ comprises $DB_1$, $DB_5$, and $DB_9$, which bands (as numbered along the RGs) are congruent modulo 4 (and so on for the second, third and fourth bang groups). Note that "4" corresponds to the minimal number of bands, i.e., in $RG_1$. Next, it can simply be verified in this example that the $j^{th}$ band group comprises at least the $j^{th}$ band of each of the RGs. Also, $RG_2$ comprises 8 bands, i.e., 2×4, that is, twice as much as $RG_1$: the condition $N=4=(C_1/k)=(C_2/l)$ is indeed fulfilled, as $C_1=4$, $C_2=8$, k=1 and l=2 in this example.

Thus, various schemes can be devised, wherein data can be swapped if they correspond to two bands defined within a same band group and if they belong to two different RGs. Obviously, the second of these two conditions may be implicit, depending on the exact definition of a band group. More generally, the data considered for swapping could be constrained to correspond to two data bands belonging to a same band group only, without further consideration as to whether the two data bands belong to two different RGs or not.

The $j^{th}$ band group may be defined such as to comprise at least the $j^{th}$ band of each of the RGs. Yet, it is advantageous to devise a scheme that ensures a one-to-one mapping between (all) the bands as defined in the whole set of band groups and (all) the bands as defined in the set of RGs. This way, all locations of physical data can potentially be swapped by the storage controller, if appropriate.

Preferably, each of the data bands corresponds to a set of consecutive logical addresses, wherein the logical addresses identify the physical data. In passing, the management of the logical addresses can be delegated at the level of RGs. This way, bands are easily defined, and are commensurate with the physical data as stored on the RGs.

In particular, each of the logical addresses of a given band (the latter corresponding to a given set of consecutive logical addresses), may point to a corresponding physical address in one of the RGs. Accordingly, each of the bands corresponds to a well defined physical memory space (in one of the RGs). A logical address typically identifies a HDD sector (or HDD block) or a SSD sector (or SSD page), which typically corresponds to 512 bytes or 4096 bytes.

Accordingly, it can be realized that the mapping of the client data addresses onto the bands may be simply achieved using one logical address only. In other words, a given client data address can be mapped onto a given band using one logical address only, chosen amongst the set of consecutive logical addresses that corresponds to the given band (for example the first address of that set). Therefore, no additional metadata is required for managing the data bands. As for instance illustrated in the examples of FIGS. 2-4 and as explained earlier: "$CA_1, CA_2, \ldots, CA_x \rightarrow DB_1 \equiv LA_{1.1}$ $\{LA_{1.1}, LA_{1.2}, \ldots, LA_{1.x}\}$" means that a first set of x client addresses $(CA_1, CA_2, \ldots, CA_x)$ is mapped onto a first data band ($DB_1$) with a single mapping entry. The latter can be identified by logical address 1.1, while implicitly encompassing a whole series of logical addresses $\{LA_{1.1}, LA_{1.2}, \ldots, LA_{1.x}\}$, since x consecutive logical addresses are assumed for each band. Thus, no (or few) additional metadata is required for identifying the data bands.

One RG may correspond to a set of one or more hard disk drives and another RG may correspond to a set of one or more solid state drives, i.e., a first RG comprises an SSD array, while a second RG comprises an HDD array. However, RGs need not necessarily to restrict to a given type of array. Yet, two RGs shall typically have different characteristics in terms of data access performances and/or data retention, whence a potential benefit when swapping data.

Concerning now the data access needs evoked earlier: the data access needs are preferably determined by statistics of data accesses by the one or more client applications, e.g., most recently and/or frequently data accessed by the client applications. They can even be dynamically updated, see e.g., step S12 vs. step S32 in FIG. 1. Accordingly, the most recently and/or frequently data, i.e., the "hot" data bands on a slower redundancy group can be dynamically relocated to a faster redundancy group, and in exchange cold data bands belonging to a faster redundancy group is relocated to a slower redundancy group.

2. Specific Implementation Details

At present, more technical details shall be given which correspond to practical implementations as tested by the present Inventors so far.

2.1 System

Typically, two redundancy groups (e.g., $RG_1$ and $RG_2$ in FIG. 2 or 3) utilize the same RAID level and the same encryption scheme, although that is not a strict requirement for the proposed embodiments. RAID-5 is assumed in the following, for the sake of illustration. The two redundancy groups are grouped together by the system 100 to form a single virtual address space, i.e., in a RAID-0-like configuration (VLAS 120 in FIG. 2 or 3). The I/O operations to the redundancy groups are managed by the storage controller 150, which is an embedded system using a CPU (ref. 104 in FIG. 2 or 3) and a limited number of DRAM buffers (ref. 106 in FIG. 2 or 3). The controller 150 is also equipped with a host interface (ref. 102 in FIG. 2 or 3) through which it connects to the host, i.e., the client applications 10 and storage subsystem interfaces (not shown) to access the physical disks. The controller receives I/O requests from the host and translates them to physical I/O requests which are forwarded to the SSDs and HDDs. In particular, logical volumes 111, 112 (LV-i in FIGS. 2-4) can be created by the users on top of the virtual RAID array 120, as known in the art. The host issues I/O requests to the logical volumes, which the controller first translates to I/O operations in the virtual address space and then to physical I/O operations on the SSD and HDD redundancy groups. Whether and how use is made of such logical volumes is however not critical for the present embodiments and will not be discussed further. To increase performance, the controller may also maintain a cache of the most frequently accessed blocks in DRAM. Note that the RAID-5 functionality of the redundancy groups may be provided by the storage system controller itself, using the embedded CPU or dedicated hardware; alternatively, it may be implemented at a lower level, inside each one of the disk arrays. For instance, in FIG. 1, it is assumed that the RAID-5 functionality is implemented inside each one of the arrays.

2.2 Present vs. Usual Paradigms

The present approach assumes solid state devices that outperform HDDs both in terms of throughput and response time, at both reads and writes, for sequential as well as random access patterns, although this is not a strict requirement for implementing embodiments of the present invention. Since, in this paradigm, the SSDs are faster than the HDDs, the system aims at utilizing them as much as possible. In order to optimize the performance, one may store the most frequently accessed blocks of data (also referred to as hot data) on the SSDs, while the rest of the data are stored on the HDDs. This, however, can be made fully transparent to the host. Namely, for the hosts, the whole storage system appears as a virtual device that has a storage capacity equal to the aggregate capacity of the SSD array and the HDD array. This is in contrast to a system using the SSD array as a cache device where only the capacity of the HDD array would be visible. The mapping of virtual blocks to physical blocks is maintained internally at the storage system controller 150. The controller also keeps statistics about the use and access frequency of individual blocks (step S12). Based on these statistics, on-line algorithms decide the optimal storage medium for each block, that is, whether it should be stored on the SSDs or on the HDDs.

In that respect, embodiments of the present invention aim at efficiently storing the mapping metadata using very limited DRAM resources, as would typically be required by an embedded controller, while at the same time allowing a high degree of freedom when choosing data migrations and minimizing the I/O cost of each migration.

The present approach reverses a usual paradigm of hybrid systems, wherein it is assumed that the SSDs have worse random write performance than the HDDs. Furthermore, previous approaches do usually not target embedded storage controllers. Rather, they are sometimes designed for host servers and tailored for database applications. Thus, it is assumed that ample amounts of DRAM are available for storing mapping metadata and statistics for the accessed blocks, such that the problem of efficiently storing metadata using less memory is not even apparent. Other known approaches are specifically targeted at database servers and therefore also assume plenty of main memory available to store mapping information and statistics about the access history of memory blocks. Still other approaches primarily focus on deciding the optimal placement of data to achieve the maximum performance in terms of throughput and latency but such approaches do not more address the problem of storing metadata using limited DRAM and CPU resources. Furthermore, even if sufficient DRAM and CPU resources are available, known approaches mostly trade off granularity against accuracy by simply tracking data at a significantly higher granularity, i.e., on the order of gigabytes.

More generally, systems are usually designed to run in high-end storage controllers with plenty of DRAM memory available for metadata, such that the metadata footprint is not an issue.

In contrast to such approaches, present embodiments target embedded environments of execution and are accordingly specifically tailored for systems with limited memory buffers and restricted processing capabilities. In addition, in embodiments, autonomous systems are provided that enable placement decisions at a sub-MB granularity; decisions can furthermore be evaluated at a sub-second granularity, possibly at every access to a block of data, thereby providing exceptional improvement over the known systems.

2.3 Specific Implementation Details

The following describes details of the embodiments described in Sect. 1, by which an embedded storage controller, with a small amount of DRAM memory for metadata, can efficiently maintain a mapping of logical (virtual) to physical locations, as well as statistics about the access history. Meanwhile, a high degree of freedom can be offered when choosing data to be migrated and the I/O cost of each migration minimized.

Data Bands

As described earlier, such schemes utilize bands of data or bands, which may consist of a fixed number of physical blocks. A band can be defined on SSD or HDD storage.

A preferred solution is one wherein the system maintains mapping and access history metadata only for a subset of the total bands in the system: for the bands that have migrated to the SSDs at any given time and for the most recently or frequently accessed bands stored on the HDDs. Yet, the metadata footprint can be fixed, and thus does not grow with the number of migrated bands in the system. Depending on the size of the available memory, the system can have varying degrees of freedom with respect to choosing band migrations. At the same time, depending on the scheme used, migrations incur a different I/O cost. Effectively, the system designer can trade off memory with freedom to choose data placement, as well as with I/O cost savings per band migration. Note that in the present context, the actual algorithms that decide the optimal placement for each band of data is not a primary focus, i.e., many algorithms can be chosen.

Band Placement

The placement of a band can be decided atomically in the system. As evoked earlier, a band may consist of consecutive logical blocks. Typically, the band size (fixed for all bands) is between 256 KB and 1 MB. Note that for special sector sizes (e.g., 524 or 528 bytes) used in certain systems the actual band size is slightly larger in order to keep the same amount of sectors per band as in a configuration with 512 bytes sector sizes. Thus, one understands that, in preferred embodiments, each band could correspond to:

at most 1 megabyte (or 512 or 256 Kbytes) for sector sizes of 512 bytes;

at most 1.0234375 megabytes (or 524 or 262 Kbytes) for special sector sizes of 524 bytes; and at most 1.03125 megabytes (or 528 or 264 Kbytes) for special sector sizes of 528 bytes, etc.

Note that some product implementations might actually use larger data bands, e.g., 2 megabytes or even 4 megabytes, due to some implementation technical constraints, i.e., the above preferred values might be scaled by a factor of 2 or 4.

The band size is preferably aligned to physical block/page boundaries of HDDs and SSDs. Each band is initially defined either on the SSDs or on the HDDs. Preferably, in case of thin-provisioning (i.e. where storage space is allocated on-demand, hence only a fraction of the available storage space is initially visible to the user) the storage space being used first is mapped to SSD bands. Subsequently, depending on the access history of the band, the physical data it corresponds to may migrate to the other storage medium or not. The virtual address of a band, i.e., its global logical LBA, indicates whether it belongs to the SSD LBA range or in the HDD LBA range. The former means that the band was initially defined on the SSDs, while the latter means it was initially defined on the HDDs.

Constrained Swapping: Data Band Groups

As discussed earlier, a number of SSD bands are associated with a number of HDD bands to form a group of bands. For example, we may assume that k SSD bands are associated with l HDD bands to form a group. The bands can be grouped by means of either an explicit or an implicit mapping. However, an implicit mapping is preferred, inasmuch as an explicit mapping requires DRAM memory to store the mapping. When constraining the swapping step, each band in the group may migrate to another storage medium (RG) only to replace some other band of the same group, i.e., when doing migrations. Thus, only the members of a same group can be swapped and hence very limited amount of meta-data must be kept to track swapped data bands. When l=k=1, then a single bit is sufficient. If there are more than one band in the same RG of a given band group (l+k>2), a very small index table can be used to track the swapped bands in the band group.

Modulo Operation

A preferred embodiment using an implicit mapping via a modulo operation is now described in details. To that aim, the syntax has to be changed somewhat, compared to the more general description of embodiments as given in section 1. Assume for instance that the capacity of the HDD array in bands (i.e., number of bands it comprises) is $C_{HDD}$, while the capacity of the SSD array is $C_{SSD}$. Then it is required that $(C_{SSD}/k)=(C_{HDD}/l)=N$, yielding the modulus, i.e., the number of groups in the system. An HDD band z belongs to group g if and only if $z \mod (C_{HDD}/l)=g$. Accordingly, an SSD band x belongs to group g if and only if $x \mod (C_{SSD}/k)=g$. We refer to g as the group identifier (or group id) for bands z, x.

In other words, considering the data bands numbered such as to form a well-ordered set, any two bands within a given band group are congruent modulo N.

As an example (and a special case), assume that the total capacity of the HDD array, $C_{HDD}$ is h times more than the total capacity of the SSD array, $C_{SSD}$, i.e., $C_{HDD}=h \times C_{SSD}$ and $l=h \times k$ (k=1). That is, for k=1 every band defined on the SSDs, x, is implicitly associated with l=h bands amongst the HDD bands, $z_0 \ldots z_{l-1}$.

We can then use modulo-l equality as a criterion for group membership. Let addr(i) denote the physical address in one of the arrays for band i. Then addr(x) is the physical address of band x on the SSD array and for the addresses of the HDD bands we have the following:

$$\text{addr}(z_0)=\text{addr}(x)$$

$$\text{addr}(z_1)=C_{SSD}+\text{addr}(x)$$

$$\ldots$$

$$\text{addr}(z_{l-1})=(l-1)C_{SSD}+\text{addr}(x)$$

In general, a group can consist of any number (larger than zero) of HDD bands and any number (larger than zero) of SSD bands.

Metadata can be maintained for keeping track of each band (or only those which have migrated), and can be accessed using various data structures. Configuring and maintaining such data structures can be easily achieved by the skilled person, following directions as given above.

Swapping Process

Typically, an additional buffer can be used to perform the swapping of two bands. As data is swapped from persistent storage, adequate means may be used to protect data in temporary swapping buffers from being lost due to power failures. This is preferably done with battery-backed DRAM, or using reserved locations on SSDs or HDDs.

2.4 Miscellaneous

Computer program code required to implement at least parts of the above invention may be implemented in a high-level (e.g., procedural or object-oriented) programming language, or in assembly or machine language if desired; and in any case, the language may be a compiled or interpreted language. Suitable CPUs use processors which include general and special purpose microprocessors. Note that instruction operations that the present systems perform may be stored on a computer program product tangibly embodied in a machine-readable storage device for execution by one or more programmable processors; and method steps of the above embodiments may be performed by one or more programmable processors executing instructions to perform functions as described above. In all case, the present invention may encompass not only the systems described above, but also more general systems including these.

More generally, the above invention may be implemented in digital electronic circuitry, or in computer hardware, firmware, software, or in combinations of them.

Generally, a processor will receive instructions and data from a read-only memory and/or a random access memory, e.g., a DRAM such as evoked earlier in reference to FIG. 2 or 3.

While the present invention has been described with reference to certain embodiments, it will be understood by those skilled in the art that various changes may be made and equivalents may be substituted without departing from the scope of the present invention. In addition, many modifications may be made to adapt a particular situation or device to the teachings of the present invention without departing from its scope. Therefore, it is intended that the present invention not be limited to the particular embodiment disclosed, but that the present invention will include all embodiments falling within the scope of the appended claims. For example, the present storage controllers 150 may be provided in software, hardware or combination of both.

The invention claimed is:

1. A storage system configured for optimizing locations of physical data accessed by one or more client applications, comprising:
    a set of at least two redundancy groups, wherein each of the redundancy groups comprises physical memory spaces and data bands, each of the data bands corresponding to physical data stored on several of the physical memory spaces of the each of the redundancy groups;
    a virtualized logical address space, comprising client data addresses utilizable by the one or more client applications; and
    a storage controller configured to:
        map the client data addresses onto the data bands, such that a mapping is obtained, whereby the one or more client applications can access physical data corresponding to the data bands; and
        swap physical data corresponding to one data band of one of the at least two redundancy groups with physical data of another data band of another one of the at least two redundancy groups, based on data access needs of the one or more client applications, and accordingly update the mapping.

2. The storage system of claim 1, wherein the storage controller is further configured to constrain the one data band and the another data band to belong to a same data band group, the latter defined within a set of data band groups, wherein each data band group of the set of data band groups comprises at least two data bands, each of the at least two data bands belonging to different redundancy groups of the set of redundancy groups.

3. The storage system of claim 2, wherein the set of data band groups is defined such that a $n^{th}$ data band group of the set of data band groups comprises a $n^{th}$ data band of each of the redundancy groups.

4. The storage system of claim 3, wherein the storage controller is configured to map the client data addresses onto the data bands using one of the logical addresses of a set of consecutive logical addresses per data band mapped.

5. The storage system of claim 1, wherein each of the data bands corresponds to a set of consecutive logical addresses, wherein each of the logical addresses points to a corresponding physical address in one of the redundancy groups, such that the each of the data bands corresponds to several physical memory spaces in one of the redundancy groups.

6. The storage system of claim 1, wherein the data access needs are determined by statistics of data accesses by the one or more client applications.

7. The storage system of claim 1, wherein each of the data bands corresponds to at most 1.03125 megabyte of the stored physical data.

8. A non-transitory, computer readable storage medium comprising computer readable instructions stored thereon that, when executed by a computer, causes the storage system of claim 1 to:
- map the client data addresses onto the data bands, such that a mapping is obtained, whereby the one or more client applications can access physical data corresponding to the data bands; and
- swap physical data corresponding to one data band of one of the at least two redundancy groups with physical data of another data band of another one of the at least two redundancy groups, based on data access needs of the one or more client applications, and accordingly update the mapping.

* * * * *